Sept. 29, 1970     M. P. HOGUE ET AL     3,530,723

METER HAVING METER COVER LINER

Filed June 25, 1968

Inventors,
Marcus P. Hogue,
Paul D. Jacobson,
by Francis K. Doyle
Their Attorney.

United States Patent Office 3,530,723
Patented Sept. 29, 1970

3,530,723
METER HAVING METER COVER LINER
Marcus P. Hogue, Rochester, and Paul D. Jacobson, Greenland, N.H., assignors to General Electric Company, a corporation of New York
Filed June 25, 1968, Ser. No. 739,769
Int. Cl. G01d 11/26
U.S. Cl. 73—431                                    4 Claims

ABSTRACT OF THE DISCLOSURE

A meter including a meter cover liner of plastic sheet material mounted within the glass cover of the meter, such as a watthour meter. The plastic material is vacuum formed in the shape of the meter cover and has a cylindrical side wall which fits snugly against the inside cylindrical side wall of the meter cover. The liner has a flange secured between the glass cover and the meter base. Alternatively, or additionally, the side walls of the liner are fastened to the inside wall of the cover by an adhesive material. The face of the liner is approximately 5 to 10 mils below the meter cover face. A desiccant material is placed between the liner and the cover to absorb moisture.

BACKGROUND

This invention relates to a metering device and, more particularly, to a metering device having a plastic meter cover liner used inside the glass cover of the meter for protection of the meter.

Meter devices, such as watthour meters, are usually provided with a clear glass cover to enable a meter reader to read the register or other indicating means of the meter. Many present day meters are mounted on the outside walls of homes, or commercial and industrial establishments, where the glass cover is subject to much accidential or intentional abuse. When the cover is broken, particle of glass may enter the meter, damaging its mechanism and preventing accurate measurement of the measured commodity, such as, for example, electrical power. If the cover is not broken, but only cracked, the cracks will allow dirt and moisture to enter the meter, also damaging its mechanism. Since may utilities only read meters on a monthly or bimonthly basis, a damaged meter cover may go unnoticed for many weeks, leading to serious damage of the metering device.

There has been a recognized need in the metering field to provide some means to prevent damage to metering devices in the event of a broken or damaged cover. Plastic covers have been proposed in place of the glass covers. However these generally do not provide sufficient clarity, having a tendency to distortion in the thicknesses necessary to provide adequate protection. Therefore, such covers do not allow as easy a reading of the meter registers as do the clear glass covers. Further, if such plastic is strong enough to resist breakage, it usually is to expensive, being approximately four to five times as costly as glass. The less expensive plastic material can be easily broken. Also, it may be easily drilled, allowing foreign matter to be inserted to slow the meter. Thus, plastic covers, especially for watthour meters, have not been generally accepted by the electric utilities. A plastic enclosure for the glass cover has also been suggested. However, these enclosures add a large additional expense to the metering device. Also, they are difficult to see through, due to the distortion of the material at the thicknesses necessary to provide adequate protection. Further, they tend to trap mositure between the cover and the enclosure tending to make it more difficult to read the metering device. It has also been proposed to coat the inner surface of the glass cover with a plastic material which would strengthen the glass. These coatings are difficult to apply and generally are very expensive.

It has recently been discovered that meters could be protected by a plastic liner placed within the glass cover. With the face of the liner separated by a small distance from the face of the cover, the liner is not directly affected by a blow on the glass and prevents glass or other foreign matter from entering the meter mechanism. When the meter cover is damaged or cracked, the plastic liner, due to its separation at the face, usually provides sufficient protection for the metering device to protect the meter device from mositure and other contaminants as well as broken particles of glass until such time as the damaged cover has been noticed and replaced.

Therefore it is one object of this invention to provide a plastic meter cover liner within the glass cover of a meter.

A further object of this invention is to provide a metering device having a separate plastic meter cover liner fitting within the glass cover, with the face of the plastic liner spaced from the face of the glass cover.

A still further object of this invention is to provide a combination glass cover and plastic cover liner for a metering device with portions of the liner adhering to portions of the cover and other portions of the linear spaced from the cover.

Yet another object of this invention is to provide a combination meter cover and plastic liner having moisture removing means secured between the cover and liner.

SUMMARY OF INVENTION

Briefly, in a preferred form, this invention comprises a plastic meter cover liner formed in substantially the same shape as the meter cover. The plastic liner is mounted within the meter cover with the side wall of the liner fitting snugly against the side wall of the cover and the face of the liner spaced from the face of the cover. In the preferred form a flange or rim is formed on the liner, fitting between the meter cover and base of the meter. In another form, an adhesive material may be provided, securing the side wall of the liner to the side wall of the cover. A desiccant material may be placed between the liner and the cover to absorb any trapped moisture or moisture which might permeate into the space between the liner and the cover.

The invention which is sought to be protected will be particularly pointed out and distinctly claimed in the claims appended hereto. However, it is believed that this invention, and the manner in which its various objects and advantages are obtained, as well as other objects and advantages thereof, will be more clearly understood by reference to the following detailed description of a preferred embodiment thereof, particularly when considered in the light of the accompanying drawing.

DESCRIPTION OF PREFERRED FORM

This invention comprises a plastic meter cover liner secured inside the glass cover of a metering device to prevent glass particles of moisture or other contaminants from damaging the meter mechanism should the glass cover be broken or cracked in use. The preferred embodiment is shown as applied to a watthour meter, although other types of meters may also benefit from the use of this invention.

Figure 1:
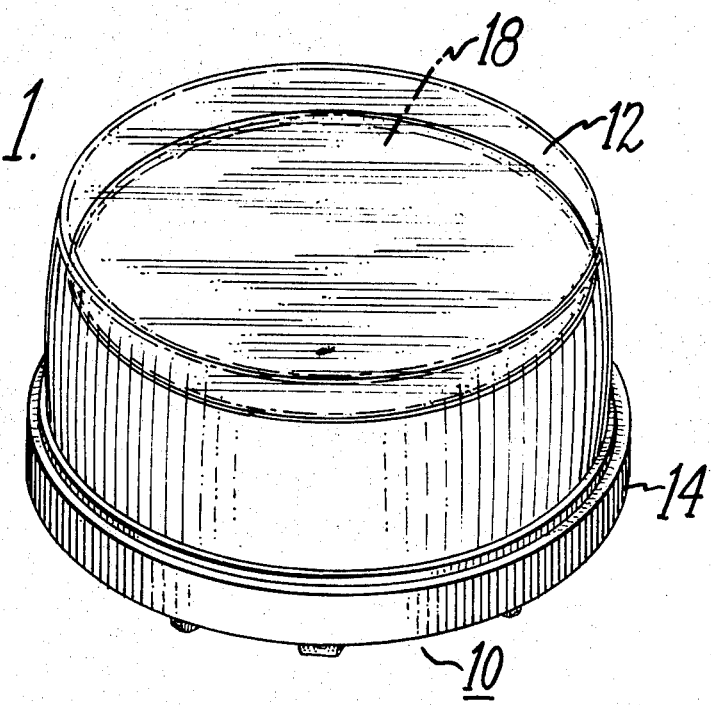
FIG. 1 is a perspective view of one form of watthour meter showing this invention.
Figure 2:
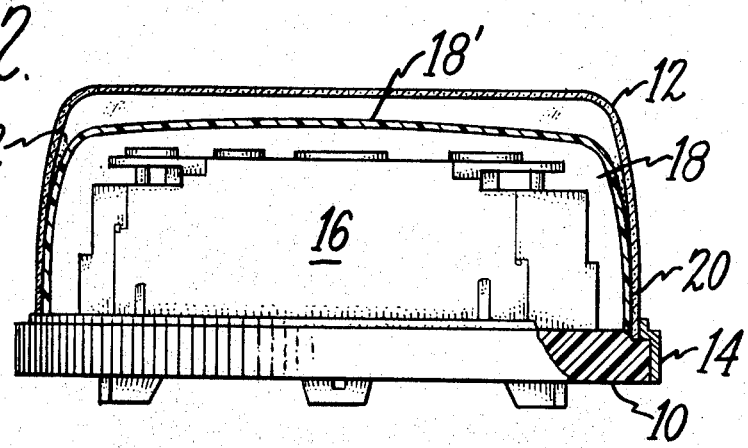
FIG. 2 is a sectional view of the meter of FIG. 1.

Referring now to the drawings in which like numerals are used to indicate like parts throughout the various thereof, there is shown in FIG. 1 a meter base 10 having a glass cover 12 secured thereto in sealing engagement by a metal flange 14. A metering mechanism 16, as shown in FIG. 2 is mounted on the base 10 and is protected from dirt, moisture and the like, by the glass cover 12. This is the standard watthour meter, as will be readily recognized by those skilled in the metering art.

Figure 3:
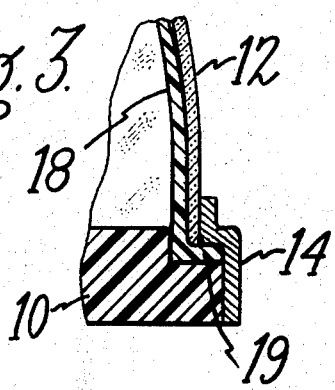
FIG. 3 is a partial sectional view showing the preferred form of securing the linear within the meter cover.

The invention is shown in the form of a plastic meter liner, indicated at 18 in the drawing, with the plastic meter liner 18 snuggly fitting against the side walls of the glass cover 12. The face 18' of the meter liner 18 is spaced from the face of the meter cover 12 by a small distance. As can be seen especially in FIG. 2, due to the taper of both the meter cover 12 and the meter cover liner 18, the upper portion of the side walls of the liner 18 are also spaced slightly from the upper side walls of the meter cover 12. In the preferred form of the invention, as best shown in the partial sectional view of FIG. 3, the plastic liner 18 is provided with a flange or rim 19. The flange or rim 19 fits under glass cover 12, as shown, between the bottom of cover 12 and the base 10. This securely holds the plastic liner 18 within glass cover 12, protecting the meter mechanism 16.

In another form of the invention, as is indicated in FIG. 2, a plastic or other type of adhesive material 20 may be provided along the lower side wall between the outside side wall of the liner 18 and the inside side wall of the cover 12. This plastic material 20 firmly secures the liner to the cover and also provides a certain resiliency to the contact area between the meter cover and the meter liner 18. Of course, it will be understood that the rim or flange 19 could be used, in additional to the adhesive 20, if desired.

A plurality of dots 22 are indicated in FIG. 2 to show the use of a desiccant material within the space between the liner 18 and the cover 12. This desiccant material is useful for absorbing any moisture which may form between the cover 12 and the liner 18 during manufacture or assembly of the combination and also to absorb any moisture which may subsequently permeate into the space, either due to cracking of other means, while the liner and cover are in use.

In the preferred form of the invention the liners are vacuum formed out of a plastic material, for example, a cellulose acetate butyrate or a polycarbonate material. The cellulose acetate butyrate material is relatively easy to work with and provide successful liners by a vacuum formation. These liners have been impact tested with a BB air rifle fired from 10 feet. Further, with photoelectric testing for watthour meter calibration, the liner does not impair such testing. It has been found that any plastic material having a tensile strength of approximately 200 p.s.i. or greater is capable of performing the desired function of a plastic meter liner. A film 10 mils thick has been found sufficient in both the cellulose acetate butyrate and the polycarbonate material to provide a meter liner meeting the requirement of this invention.

Since the assembly of the cover and liner would normally be in position for many years on the meter, in some instances 30 or more years, should the glass remain intact, it is considered desirable to secure the liner within the glass cover by means of the flange 19 or the plastic material such as 20 indicated in FIG. 2, or both. Also, it is considered desirable to provide pellets of a desiccant material in order to absorb any moisture which may be trapped, or which may later permeate within the space between the liner and the cover. It has also been found that if the face of the liner is spaced approximately 5 to 10 mils from the cover, a blow on the cover is not felt directly by the liner. The liner serves as a diaphragm preventing the passage of any foreign particles through it should the cover be broken. As will be understood, the most severe damage to glass meter covers generally occurs directly on the face of the meter or along the top side wall where the spacing between the liner and the cover is provided as is clearly shown in FIG. 2. However, in the event of a blow along the side wall of the cover, the blow will in the main, be absorbed by the glass, the flexible plastic liner, and the adhesive material, if used, thereby allowing the liner to act as a diaphragm to contain any small chips of glass.

From the above it is believed clear that there has been described a cover and meter liner combination, wherein the meter liner is a separate piece mounted within the cover, and provides adequate protection for the metering mechanism mounted within the cover and liner in the event of damage to the glass cover. While the invention has been shown and described specifically with reference to the cover used in a watthour meter, it will of course be readily understood that this invention may find particular utility in any type of metering device wherein a glass cover is provided for protection of the metering device and to allow a meter reader or other operator to read the register under the glass cover. It is believed that many changes will be evident to those skilled in the art, such changes being clearly within the spirit and scope of the invention set forth in the appended claims.

What is claimed as new and which it is desired to secure by Letters Patent of the United States is:

1. A metering device comprising in combination, a base member, a meter mechanism mounted within said base member, a glass cover having depending side walls which are secured to said base member and sealed thereto, the improvement which comprises a separate plastic meter liner having depending side walls and mounted within said glass cover, said side walls of said plastic liner snugly fitting against said side walls of said meter cover and the face of said meter liner spaced from the face of said meter cover.

2. A meter device in combination as set forth in claim 1 in which a desiccant material is provided in the space between said meter cover and said meter liner.

3. A metering device as set forth in claim 2 in which said plastic liner is made from a plastic material approximately 10 mils thick.

4. A metering devise as set forth in claim 1 in which the space between the cover and the meter liner is approximately 10 mils.

References Cited

UNITED STATES PATENTS

| | | | |
|---|---|---|---|
| 1,925,999 | 9/1933 | DeGeirs | 73—314 |
| 2,575,715 | 11/1951 | Keller | 73—431 X |
| 2,611,481 | 9/1952 | Sargeant et al. | 73—431 |
| 2,612,132 | 9/1952 | Triplet. | |
| 2,773,388 | 12/1956 | Prasser | 73—431 |
| 2,871,654 | 2/1959 | Fachon | 58—98 X |
| 3,394,594 | 7/1968 | Polley et al. | 73—431 |

LOUIS R. PRINCE, Primary Examiner

D. M. YASICH, Assistant Examiner

U.S. Cl. X.R.

220—82

UNITED STATES PATENT OFFICE
CERTIFICATE OF CORRECTION

Patent No. 3,530,723    Dated September 29, 1970

Inventor(s) Marcus P. Hogue et al.

It is certified that error appears in the above-identified patent and that said Letters Patent are hereby corrected as shown below:

Correct the spelling as listed:

Column 1, line 39, before "or" - cidental -
         line 40, before "of" - particles -
         line 44, before "utilities" - many -
         line 58, before "expensive" - too -
         line 69, before "between" - moisture -
Column 2, line 26, last word in sentence - liner -
         line 62, before "within" - liner -
Column 3, line  3, before "thereof" insert -- views --
         line  7, before "and" - moisture -
         line 34, before "to" - additional -
         line 43, before "other" - to -
         line 49, before "successful" - provides -
Column 4, line 43, before "A" - metering -
         line 49, before "metering" - device -

Signed and sealed this 22nd day of December 1970.

(SEAL)
Attest:

EDWARD M. FLETCHER, JR.                WILLIAM E. SCHUYLER, JR.
Attesting Officer                      Commissioner of Patents